US012105454B2

(12) United States Patent
Tamaki et al.

(10) Patent No.: US 12,105,454 B2

(45) Date of Patent: Oct. 1, 2024

(54) FIXING DEVICE

(71) Applicant: CANON KABUSHIKI KAISHA, Tokyo (JP)

(72) Inventors: Masayuki Tamaki, Chiba (JP); Shinsuke Takahashi, Chiba (JP); Ryo Yashiro, Tokyo (JP); Yasuharu Chiyoda, Chiba (JP); Dai Kanai, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/306,952

(22) Filed: Apr. 25, 2023

(65) Prior Publication Data

US 2023/0400802 A1 Dec. 14, 2023

(30) Foreign Application Priority Data

Jun. 9, 2022 (JP) ................................ 2022-093478

(51) Int. Cl.
*G03G 15/20* (2006.01)

(52) U.S. Cl.
CPC ..... *G03G 15/2053* (2013.01); *G03G 15/2028* (2013.01); *G03G 15/2064* (2013.01); *G03G 2215/2038* (2013.01)

(58) Field of Classification Search
CPC ........... G03G 15/2028; G03G 15/2053; G03G 15/2064; G03G 2215/2035; G03G 2215/2038
See application file for complete search history.

(56) References Cited

U.S. PATENT DOCUMENTS

| | | | | |
|---|---|---|---|---|
| 8,145,086 | B2 | 3/2012 | Chiyoda et al. | G03G 15/20 |
| 8,306,446 | B2 | 11/2012 | Ito et al. | G03G 15/20 |
| 8,395,090 | B2 | 3/2013 | Chiyoda | H05B 3/00 |
| 8,712,271 | B2 | 4/2014 | Nakayama et al. | G03G 15/20 |
| 8,750,739 | B2 | 6/2014 | Tamaki et al. | G03G 15/20 |
| 8,873,986 | B2 | 10/2014 | Chiyoda | G03G 15/20 |
| 9,020,384 | B2 | 4/2015 | Kanai | G03G 15/20 |
| 9,075,355 | B2 | 7/2015 | Chiyoda et al. | G03G 15/20 |
| 9,261,825 | B2 | 2/2016 | Chiyoda | G03G 15/20 |
| 9,298,140 | B2 | 3/2016 | Moteki et al. | G03G 15/20 |

(Continued)

FOREIGN PATENT DOCUMENTS

JP 2007-292948 11/2007

OTHER PUBLICATIONS

U.S. Appl. No. 18/300,317, filed Apr. 13, 2023.

*Primary Examiner* — Sophia S Chen
(74) *Attorney, Agent, or Firm* — Venable LLP

(57) ABSTRACT

A fixing device includes a rotatable endless belt, a pressing roller and a fixing pad. The pressing roller contacts an outer peripheral surface of the belt and forms a nip portion in cooperation with the belt. A toner image is formed in the nip portion and fixed onto the recording material by application of heat and pressure. The fixing pad contacts an inner peripheral surface of the belt. The fixing pad includes a contact area in contact with the inner peripheral surface of the belt. The contact area includes a downstream end portion with respect to a conveyance direction of the recording material. The downstream end portion includes a central portion and both end portions with respect to a widthwise direction of the belt. The central portion locates downstream of the both end portions with respect to the conveyance direction.

8 Claims, 8 Drawing Sheets

(56) References Cited

U.S. PATENT DOCUMENTS

| | | | | |
|---|---|---|---|---|
| 9,304,462 | B2 | 4/2016 | Chiyoda | G03G 15/20 |
| 9,354,570 | B2 | 5/2016 | Arimoto et al. | G03G 15/20 |
| 9,488,938 | B2 | 11/2016 | Tamaki et al. | G02G 15/20 |
| 9,504,096 | B2 | 11/2016 | Kakubari et al. | G03G 15/20 |
| 9,513,592 | B2 | 12/2016 | Akiyama et al. | G03G 15/20 |
| 9,519,250 | B2 | 12/2016 | Asaka et al. | G03G 15/20 |
| 9,684,271 | B2 | 6/2017 | Moteki et al. | G03G 15/20 |
| 9,989,911 | B2 | 6/2018 | Nakama et al. | G03G 15/20 |
| 10,025,248 | B2 | 7/2018 | Kikuchi et al. | G03G 15/00 |
| 10,031,473 | B2 | 7/2018 | Nakama et al. | G03G 21/16 |
| 10,185,265 | B2 | 1/2019 | Chiyoda | G03G 15/20 |
| 10,241,433 | B2 | 3/2019 | Tanaka et al. | G03G 15/20 |
| 10,303,093 | B2 | 5/2019 | Tamaki et al. | G03G 15/20 |
| 10,303,099 | B2 | 5/2019 | Chiyoda | G03G 15/20 |
| 10,437,185 | B2 | 10/2019 | Yamaguchi et al. | G03G 15/20 |
| 10,545,442 | B1 | 1/2020 | Hirano et al. | G03G 15/20 |
| 10,691,053 | B2 | 6/2020 | Takada et al. | G03G 15/20 |
| 10,725,403 | B2 | 7/2020 | Tamaki et al. | G03G 15/20 |
| 10,877,412 | B2 | 12/2020 | Yashiro et al. | G03G 15/20 |
| 10,915,047 | B2 | 2/2021 | Tadomi et al. | G03G 15/20 |
| 11,144,008 | B2 | 10/2021 | Ito et al. | G03G 21/20 |
| 2007/0231026 | A1* | 10/2007 | Hayashi | G03G 15/2025 399/329 |
| 2019/0094771 | A1* | 3/2019 | Hazeyama | G03G 15/2053 |
| 2020/0278627 | A1* | 9/2020 | Shimada | G03G 15/2053 |
| 2022/0100134 | A1 | 3/2022 | Miyamoto et al. | G03G 15/20 |

* cited by examiner

FIXING DEVICE

FIELD OF THE INVENTION AND RELATED ART

The present invention relates to a fixing device suitable for use in image forming apparatuses utilizing electrophotographic technology, such as printers, copiers, facsimile machines or multifunctional machines.

An image forming apparatus is equipped with a fixing device that applies heat and pressure to a recording material on which a toner image is formed to fix the toner image to the recording material. The fixing device includes, for example, a rotatable endless belt, a roller that contacts an outer peripheral surface of the belt, and a pad that slides on an inner peripheral surface of the belt. The pads hold the belt between the roller and form a fixing nip portion where heat and pressure are applied to fix the toner image while nipping and conveying the recording material (Japanese Laid-Open Patent Application No. 2007-292948).

Conventionally, it is known that a configuration to form the fixing nip portion by using the pad. Furthermore, the fixing nip portion is formed by applying pressure from both end portions of the belt in a widthwise direction. This may cause the belt to wrinkle due to a pressure difference in the widthwise direction. The wrinkle of the belt causes occurrences of wrinkles on the recording material.

The present invention was invented in consideration of the above problem and suppresses occurrences of wrinkles on the belt. By this, an object of the present invention is to provide a fixing device that can suppress the occurrences of wrinkles on the recording material.

SUMMARY OF THE INVENTION

According to an aspect of the present invention, there is provided a fixing device comprising: a rotatable endless belt; a rotatable member configured to contact an outer peripheral surface of the belt, the rotatable member forming a nip portion in cooperation with the belt, nipping and conveying a recording material on which a toner image is formed in the nip portion and fixing the toner image onto the recording material by application of heat and pressure; a nip forming member configured to contact an inner peripheral surface of the belt and form the nip portion by being disposed opposite to the rotatable member, wherein the nip forming member is a non-rotatable member and includes a contact area in contact with the inner peripheral surface of the belt, wherein the contact area includes a downstream end portion with respect to a conveyance direction of the recording material, wherein the downstream end portion includes a central portion and both end portions with respect to a widthwise direction of the belt, and wherein the central portion locates downstream of the both end portions with respect to the conveyance direction.

Further features of the present invention will become apparent from the following description of exemplary embodiments with reference to the attached drawings.

DESCRIPTION OF THE EMBODIMENTS

A fixing device of an embodiment will be described. First, a schematic view of an image forming apparatus suitable for using the fixing device of the embodiment will be described with referring to FIG. 1.

Embodiment 1

<Image Forming Apparatus>

An image forming apparatus 1 is an electrophotographic full-color printer that includes four image forming portions Pa, Pb, Pc, and Pd, which are provided to correspond to four colors: yellow, magenta, cyan, and black. The Embodiment 1 is the image forming apparatus 1 of tandem type in which the image forming portions Pa, Pb, Pc, and Pd are disposed along a rotational direction of an intermediary transfer belt 204, which will be described later. The image forming apparatus 1 forms a toner image (image) on a recording material in response to image signals from a document reading apparatus 2 connected to a main assembly 3 of the image forming apparatus 1 or a host device such as a personal computer which can communicate to and is connected to the main assembly 3. The recording material includes sheet materials such as sheets, plastic films, and cloths.

Figure 1:
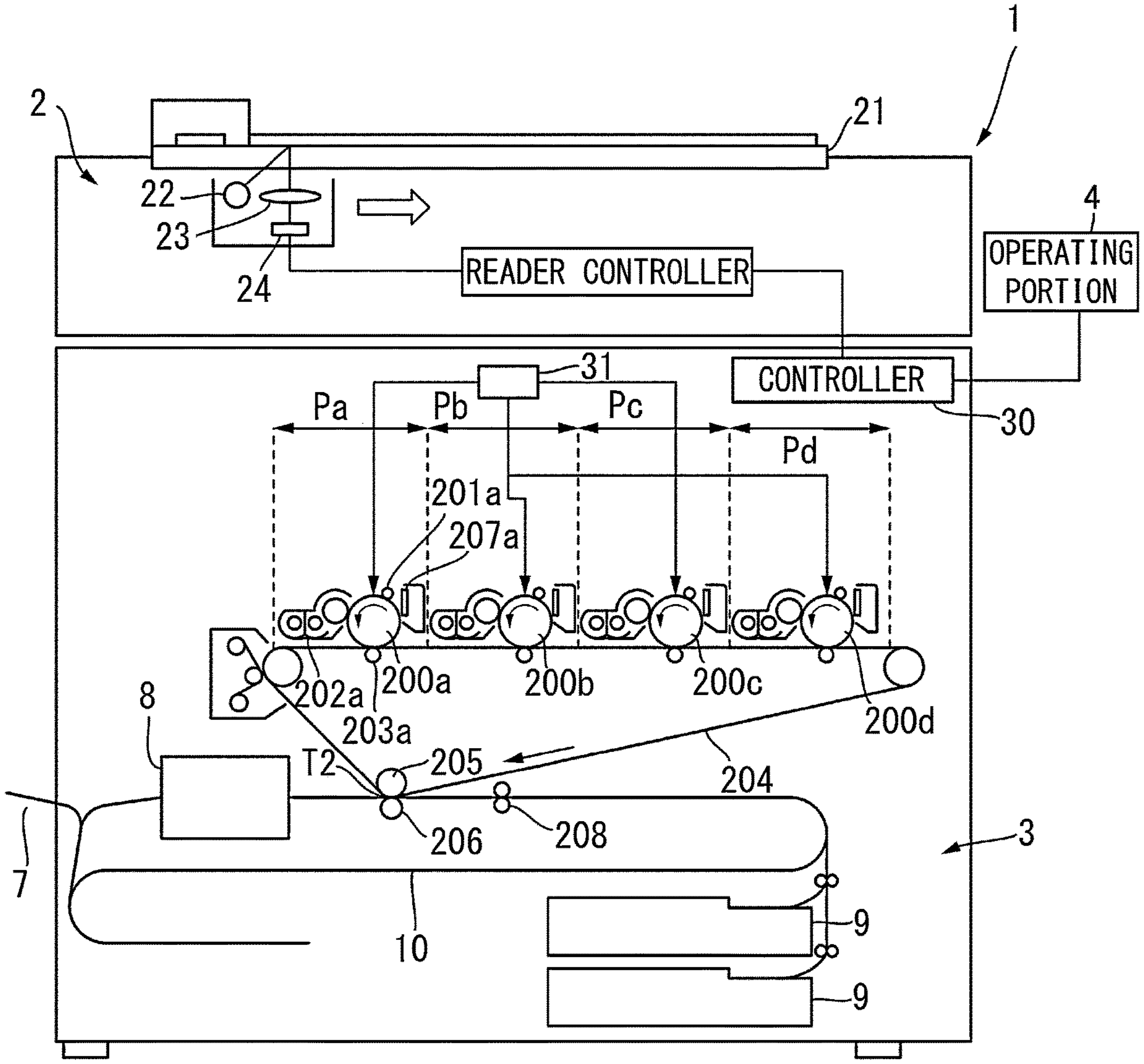
FIG. 1 is a schematic view of an image forming apparatus suitable for using a fixing device of an embodiment.

As shown in FIG. 1, the image forming apparatus 1 is equipped with the document reading apparatus 2 and the main assembly 3. The document reading apparatus 2 reads a document placed on a document table glass 21. Light emitted from a light source 22 is reflected by the document and formed into an image on a CCD sensor 24 through an optical system member 23 such as lenses. Such optical system unit reads the document, when the document is scanned in a direction of an open arrow under control of a reader control portion, line by line and converts into a sequence of electrical signal data. The image signal obtained by the CCD sensor 24 is sent to the main assembly 3, and an image processing tailored to each image forming portions is performed as described below at a control portion 30. In addition, the control portion also receives an external input as image signals from an external host device such as a print server.

The main assembly 3 is equipped with a plurality of the image forming portions Pa, Pb, Pc, and Pd, each of which performs image forming based on the image signal described above. That is, the image signal is converted into a laser beam of which pulse width is modulated (PWM) by the control portion 30. A polygon scanner 31 as an exposure device scans the laser beam corresponding to the image signal. Then, the laser beam is irradiated to photosensitive drums 200*a*, 200*b*, 200*c* and 200*d* as image bearing members of each image forming portions Pa, Pb, Pc and Pd.

Incidentally, the image forming portion Pa forms toner images of yellow color (Y), the image forming portion Pb forms toner images of magenta color (M), the image forming portion Pc forms toner images of cyan color (C), and the image forming portion Pd forms toner images of black color (Bk), respectively, of the corresponding colors. Since the image forming portions Pa, Pb, Pc and Pd have substantially the same configuration, a description of image forming portion Pa, which forms toner images of yellow color (Y), will be given below as an example, and the descriptions of the other image forming portions Pb, Pc and Pd will be omitted. In the image forming portion Pa, the toner image is formed on a surface of the photosensitive drum 200*a* based on the image signal, as described below.

Charge roller 201*a* as a primary charger charges a surface of the photosensitive drum 200*a* to a predetermined potential and prepare for an electrostatic latent image formation. An electrostatic latent image is formed on the surface of the photosensitive drum 200*a*, which is charged to the predetermined potential, by the laser beam from the polygon scanner 31. A developing unit 202*a* develops the electrostatic latent image on the photosensitive drum 200*a* and forms the toner image. A primary transfer roller 203*a* discharges from a back surface of an intermediary transfer belt 204 and applies a primary transfer bias of opposite polarity to toner to transfer the toner image on the photosensitive drum 200*a* onto the intermediary transfer belt 204. After the transfer, the surface of the photosensitive drum 200*a* is cleaned by a cleaner 207*a*.

In addition, the toner image on the intermediary transfer belt 204 is conveyed to the next image forming portion, where the toner images of each color formed in the respective image forming portions are transferred in the order of Y, M, C, and Bk, and four color images are formed on the surface of the intermediary transfer belt 204. Then, the toner image that has passed through the image forming portion Pd of Bk, which is in the downstreammost with respect to a rotational direction of the intermediary transfer belt 204, is conveyed to a secondary transfer portion T2, which is constituted of a pair of secondary transfer rollers 205 and 206. Then, in the secondary transfer portion T2, by applying a secondary transfer electric field of opposite polarity to the toner image on the intermediary transfer belt 204, the toner image is secondarily transferred from the intermediary transfer belt 204 to the recording material.

The recording material is accommodated in a cassette 9, and the recording material fed from the cassette 9 is conveyed to a registration portion 208, which is constituted of a pair of registration rollers, for example, and waits in the registration portion 208. Then, the registration portion 208 conveys the recording material to the secondary transfer portion T2, after a timing is controlled to align the toner image on the intermediary transfer belt 204 with the recording material.

The recording material on which the toner image is transferred in the secondary transfer portion T2 is conveyed to a fixing device 8 where the toner image carried on the recording material is fixed to the recording material by being heated and pressed. The recording material that has passed through the fixing device 8 is discharged onto a discharge tray 7. Incidentally, in cases that images are formed on both sides of the recording material, when the transfer and fixing of the toner image on the front side of the recording material is completed, a front side and a back side of the recording material are reversed through a reverse conveying portion 10, the transfer and fixing of the toner image on the back side of the recording material are performed, and the material is stacked on the discharge tray 7.

Incidentally, the control portion 30 controls the entire image forming apparatus 1 as described above. In addition, the control portion 30 can set various settings, etc. based on inputs from an operating portion 4 included in the image forming apparatus 1. The control portion 30 includes a CPU (Central Processing Unit), a ROM (Read Only Memory), and a RAM (Random Access Memory). The CPU controls each part while reading programs corresponding to control procedures stored in the ROM. In addition, the RAM stores working data and input data, and the CPU performs control with referring to the data stored in the RAM based on the aforementioned program, etc.

<Fixing Device>

Figure 2:
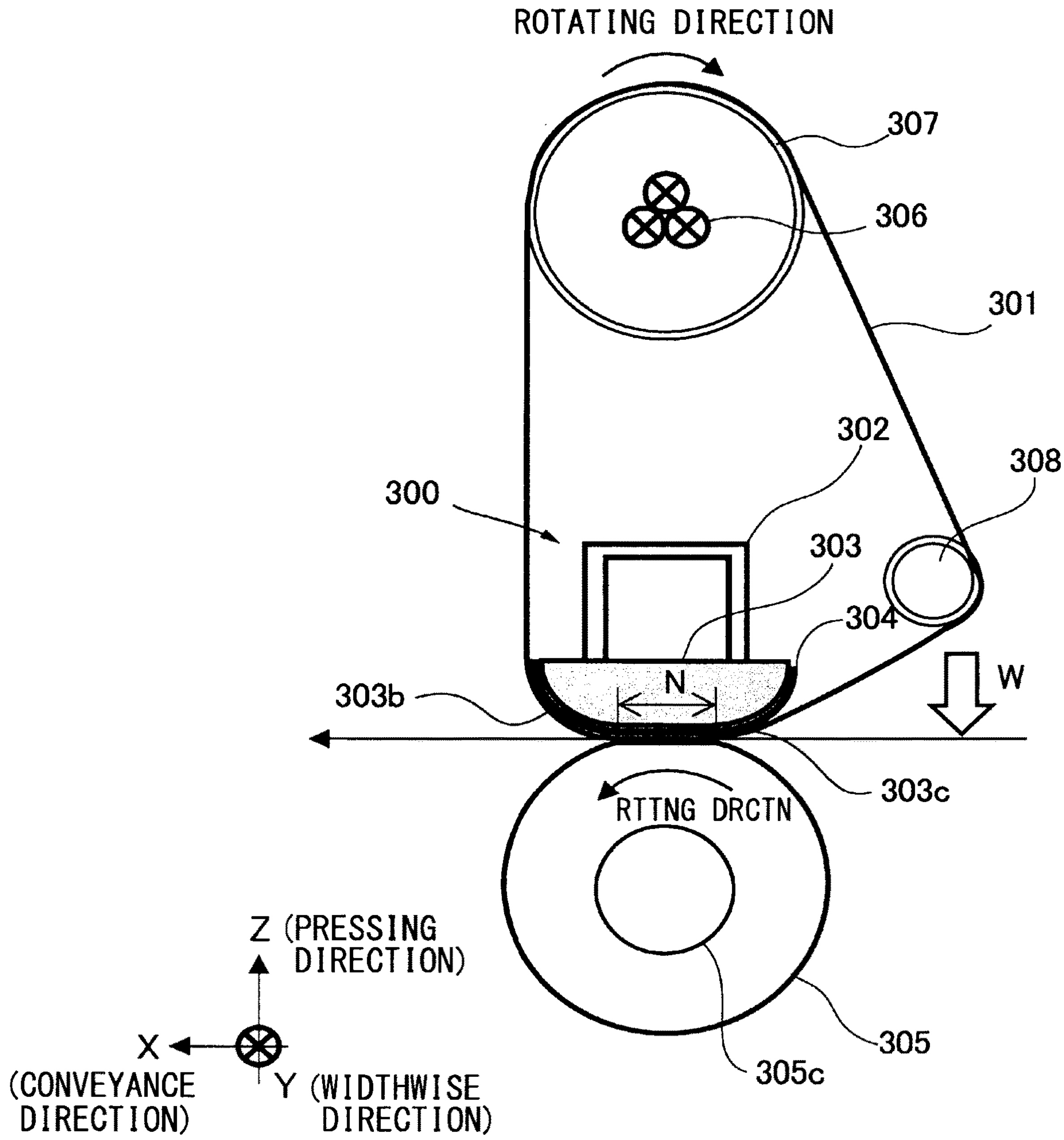
FIG. 2 is a schematic view of the fixing device.

Next, a configuration of the fixing device 8 in the Embodiment 1 is described with referring to FIG. 2. In the Embodiment 1, the fixing device adopts a belt heating method using an endless belt. As shown in FIG. 2, in the fixing device 8, the recording material is conveyed in a conveyance direction (a direction of arrow X). Incidentally, in this specification, a widthwise direction refers to a direction that intersects the conveyance direction of the recording material in a fixing nip portion N, in other words, a rotation axis direction of a pressing roller 305.

The fixing device 8 includes a rotatable endless fixing belt 301, the pressing roller 305 that contacts an outer peripheral surface of the fixing belt 301, a heating roller 307, a stretching roller 308, and a fixing pad unit 300.

<Fixing Belt>

The fixing belt 301 is stretched by the heating roller 307, the stretching roller 308, and the fixing pad unit 300. The fixing belt 301 has thermal conductivity, heat resistance, etc., and is formed in a thin-walled cylindrical shape. The fixing belt 301 is constituted of a three-layer structure, in order from an inner peripheral surface, with a base layer, an elastic layer, and a releasing layer formed on a base material such as rubber. As an example, the base layer is "80 μm" thick and made of polyimide resin (PI), the elastic layer is "300 μm" thick and made of silicone rubber, and the releasing layer is "30 μm" thick and made of tetrafluoroethylene perfluoroalkoxyethylene copolymer resin (PFA). In the case of the Embodiment 1, the Young's modulus of the base layer is set to 5.0 (GPa), and the Young's modulus of the elastic layer is set to "0.4 MPa". In addition, an outer diameter of the fixing belt 301 is set to "150 mm" for example.

<Heating Roller>

The heating roller 307 is disposed on the inner peripheral surface side of the fixing belt 301, and stretches the fixing belt 301 with the fixing pad unit 300. The heating roller 307 is, for example, formed in a cylindrical shape and made of a metal such as aluminum or stainless steel with a thickness of "1 mm", and inside of the heating roller 307, a halogen heater 306 as a heating source is disposed. The fixing belt 301 is heated by the heating roller 307 when the heating roller 307 is heated to a predetermined temperature by the halogen heater 306.

Incidentally, the heating roller 307 has a rotation center at one end or a proximity of the center in the rotation axis direction (widthwise direction) and is provided to be swingable relative to the fixing belt 301. By swinging the heating roller 307, a position (shifted position) of the fixing belt 301 in the rotation axis direction is controlled. In addition, the heating roller 307 is urged by a spring supported by the fixing device 8 and is also a tension roller that provides a predetermined tension to the fixing belt 301.

<Pressing Roller>

The pressing roller 305 as a rotatable member is supported by an axis as freely rotatable in the fixing device 8, has a gear (not shown) fixed at one end in the widthwise direction, and is connected to a drive source (not shown) such as a motor via the gear to be driven and rotated. When the pressing roller 305 rotates, a rotational force of the pressing roller 305 is transmitted to the fixing belt 301 by a frictional force generated in the fixing nip portion N described below, and the fixing belt 301 rotates following the pressing roller 305.

The pressing roller 305 is a roller with an elastic layer and a releasing layer formed on a cylindrical core metal 305*c*. As an example, the core metal 305*c* is made of stainless steel (SUS) with a diameter of "72 mm", the elastic layer is made of conductive silicone rubber with a thickness of "8 mm", and the releasing layer is made of PFA with a thickness of "100 μm". An outer diameter of the pressing roller 305 is set to "Φ 80 mm", for example.

The pressing roller 305 contacts the outer peripheral surface of the fixing belt 301 so as to hold the fixing belt 301 with a fixing pad 303 described below. And the pressing roller 305 presses the fixing pad 303 (in a direction of arrow Z) by a driving source not shown. In the case of the Embodiment 1, the pressing roller 305 presses the fixing belt 301 toward the fixing pad 303 so that a pressuring force in the fixing nip portion N becomes "160 kgf", a length of the fixing nip portion N in the conveyance direction becomes "24.5 mm", and a length of the fixing nip portion N in the widthwise direction becomes "326 mm".

<Fixing Pad Unit>

The fixing pad unit 300 is disposed on the inner peripheral surface side of the fixing belt 301 and includes a fixing stay 302, the fixing pad 303, and a sliding member 304. The fixing stay 302 is a rigid member made of metal, for example, extending in the widthwise direction of the fixing belt 301, and the fixing stay 302 supports the fixing pad 303 on the pressing roller 305 side. In the Embodiment 1, the fixing pad 303 supported by the fixing stay 302 is stretching the fixing belt 301 together with the heating roller 307 and stretching roller 308 and is pressed by the pressing roller 305 across the fixing belt 301. As a result, the fixing nip portion N of a wide nip is formed securely with a length in the conveyance direction and a length in the widthwise direction between the pressing roller 305 and the fixing belt 301. In the fixing nip portion N, the recording material carrying an unfixed toner image is nipped and conveyed, and then the toner image is fixed to the recording material by applying heat and pressure to the recording material.

<Fixing Pad>

The fixing pad 303 as a nip forming member is disposed non-rotatably on the inner peripheral surface side of the fixing belt 301 and presses the inner peripheral surface of the fixing belt 301. The fixing pad 303 is a resin member capable of extending in the widthwise direction, and a length in the widthwise direction of the fixing pad 303 is longer than a length in the widthwise direction of the recording material of maximum size capable of forming an image. The fixing pad 303 is, for example, formed by injection molding using a metal mold and made of a resin with good insulation and heat resistance such as a liquid crystal polymer resin. Incidentally, in order to form a fixing nip portion N in the widthwise direction side of the fixing pad 303 that presses the fixing belt 301 with the pressing roller 305 is preferably formed in a shape where a central portion is curved toward a side of the pressing roller 305 more than the end portions with respect to the widthwise direction.

To reduce the frictional force between the fixing belt 301 and the fixing pad 303, the fixing pad 303 is provided with a sliding member 304 that slides against the fixing belt 301. The sliding member 304 is disposed in a position opposing to the pressing roller 305 across the fixing belt 301. The sliding member 304 has an embossed surface with an irregularities of a few microns on a side sliding against the fixing belt 301. In addition, the inner peripheral surface of the fixing belt 301 may be coated with a lubricant such as silicone oil in order to slide the fixing belt 301 smoothly against the sliding member 304. The sliding member 304 may be fixed to the fixing stay 302 or to the fixing pad 303. Alternatively, the sliding member 304 and the fixing pad 303 may be configured integrally.

Figure 3:
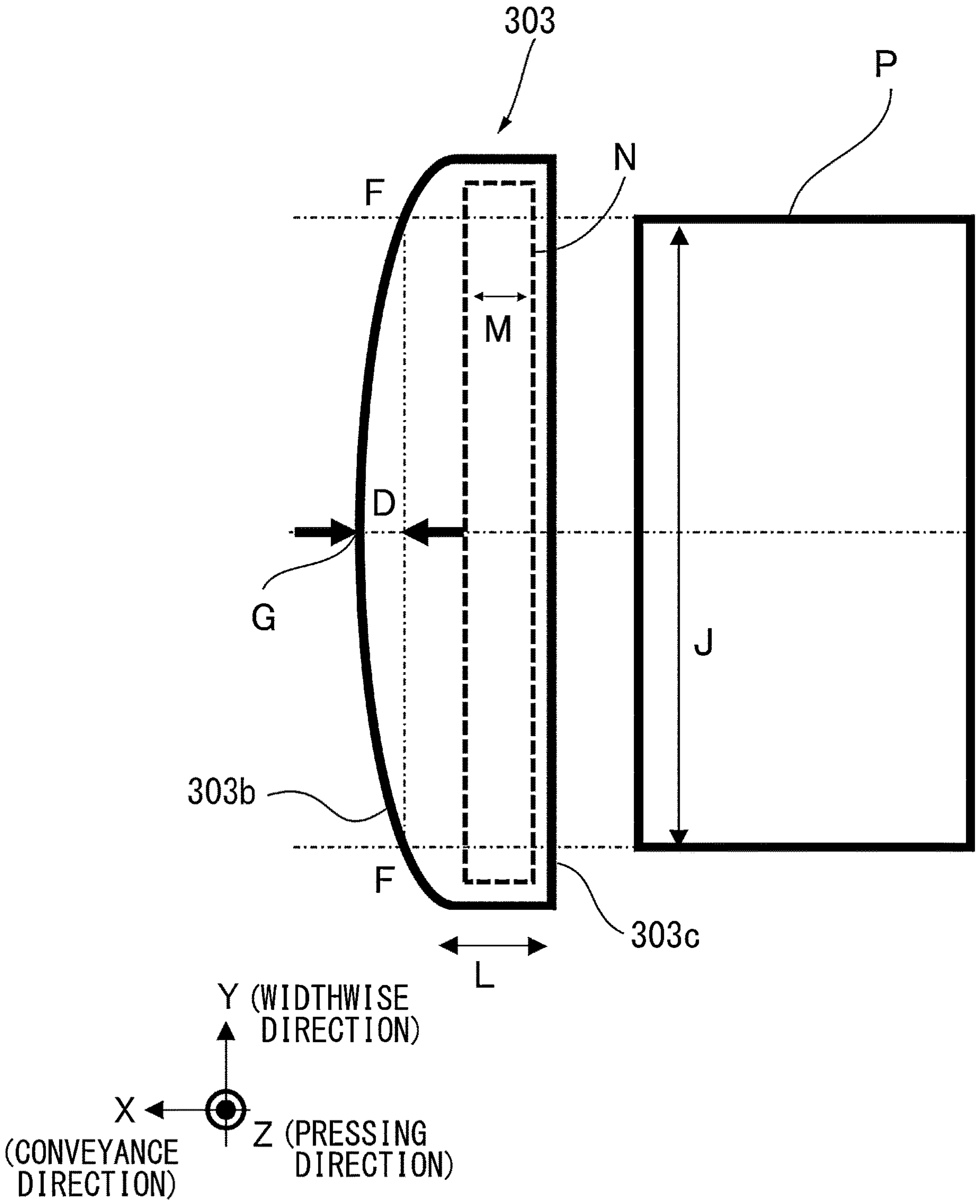
FIG. 3 is a view of a fixing pad of the Embodiment 1 viewed from an opposite side of a pressing direction.

Next, a characteristic shape of the fixing pad 303 in the Embodiment 1 will be described using from FIG. 3 to FIG. 6 with referring to FIG. 2. As shown in FIG. 2 and FIG. 3, in a contact region of the fixing pad that contacts the inner peripheral surface of the fixing belt 301, the fixing pad 303 includes an upstream end portion 303*c*, which is an end portion upstream the contact region, and a downstream end portion 303*b*, which is an end portion downstream the contact region with respect to the conveyance direction of the recording material P (direction of arrow X).

As shown in FIG. 3, the downstream end portion 303*b* of the fixing pad 303 of the Embodiment 1 is formed, with a center of the fixing nip portion N in the widthwise direction (direction of Y) as an apex, in a convex shape with the central portion protruding to a downstream side with respect to the conveyance direction more than both end portions. The downstream end portion 303*b* is protruding to the downstream side in the conveyance direction as it goes from both ends in the widthwise direction toward the center, and the center in the widthwise direction substantially corresponds to a center of the fixing nip portion N. And a length in the widthwise direction of the downstream end portion 303*b* is longer than a maximum passing through range J through which a maximum width of recording material P capable of forming an image in the fixing nip portion N can pass. Incidentally, the shape of the downstream end portion 303*b* is not limited to be formed in a quadratic curved shape smoothly connecting from one end portion to the other end portion via the center as shown in the figure, but may be formed, for example, with straight lines connecting from the center to one end portion and from the center to the other end portion, respectively.

And the fixing pad 303 is formed so that the central portion in the widthwise direction is thick in the conveyance direction and the both end portions in the widthwise direction is thin in the conveyance direction. That is, a length L in the conveyance direction from the upstream end portion 303*c* to the downstream end portion 303*b* is long in the central portion of the fixing nip portion N and becomes shorter as it goes from the central portion to the end portions.

Viewing the fixing pad 303 from an opposite side of a pressing direction (direction of arrow Z) in which the fixing pad 303 is pressed by the pressing roller 305, a protruding amount D from an end position F in the widthwise direction where the maximum passing through range J and the downstream end portion 303*b* described above intersect to a downstreammost position G of the downstream end portion 303*b*, is set to "0.3 mm", for example, with respect to the conveyance direction. For example, when the maximum passing through range J is "300 mm", then the end position F is located "150 mm" away from the center with respect to the widthwise direction, and the downstreammost position G is protruding to "0.3 mm" from the end position F to the downstream side in the conveyance direction.

Figure 4:
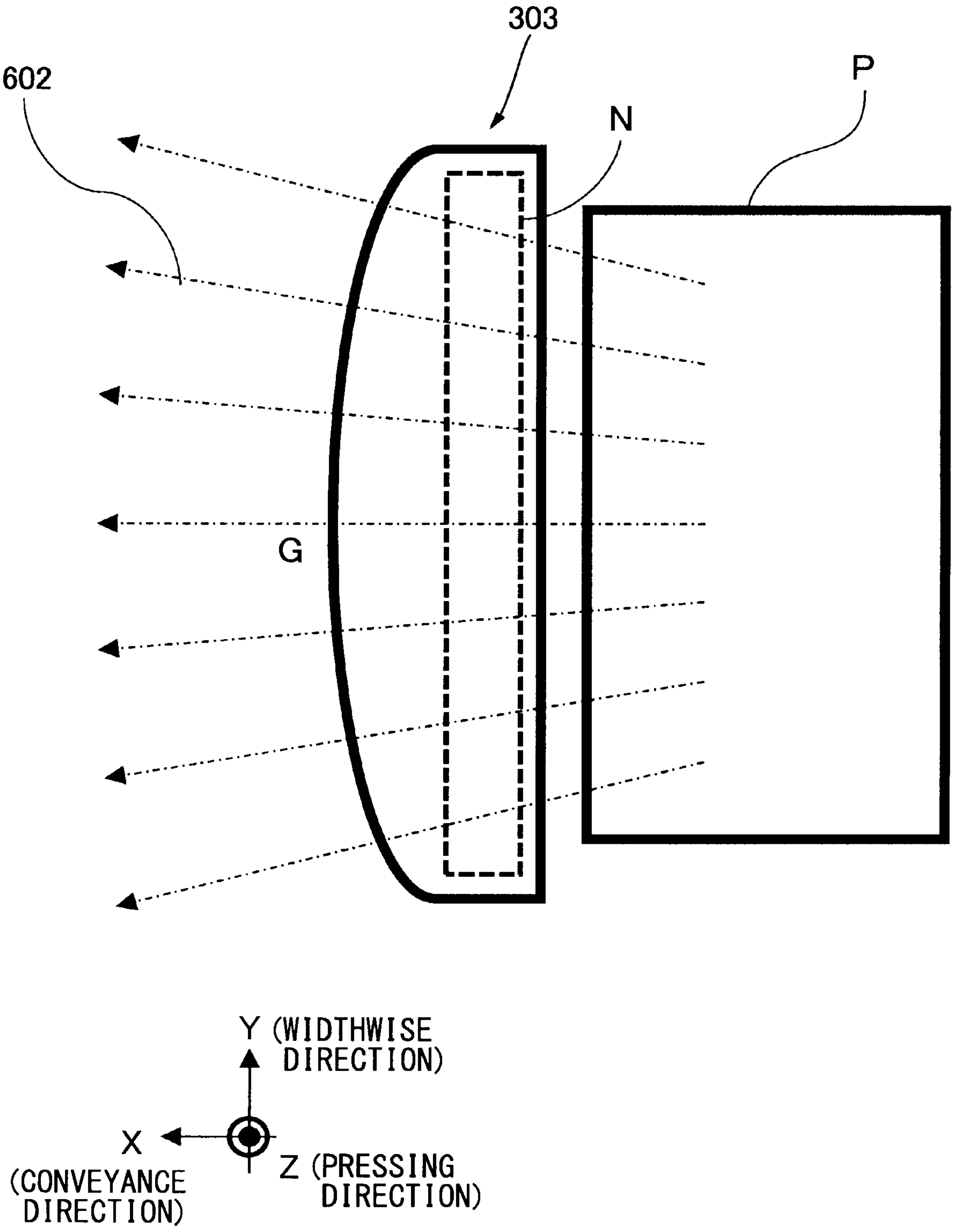
FIG. 4 is a view illustrating a running direction of the fixing belt.

By forming the fixing pad 303 in the convex shape as shown in FIG. 3, the fixing belt 301 runs as a running direction (indicated by dotted lines 602) in the widthwise direction faces outward with respect to the center (here the downstreammost position G) when the fixing belt 301 is passing through the fixing nip portion N as shown in FIG. 4. As it goes further away from the center toward the end portion, the running direction of the fixing belt 301 is facing more outward. Since the recording material P is conveyed following the running direction of the fixing belt 301, the recording material P is conveyed and passing through the fixing nip portion N with being pulled from the center to both end sides. The running direction and a conveying force (vector) of the fixing belt 301 depend on the protruding amount of the downstream end portion 303*b*.

<Protruding Amount of Downstream End Portion>

Figure 5:
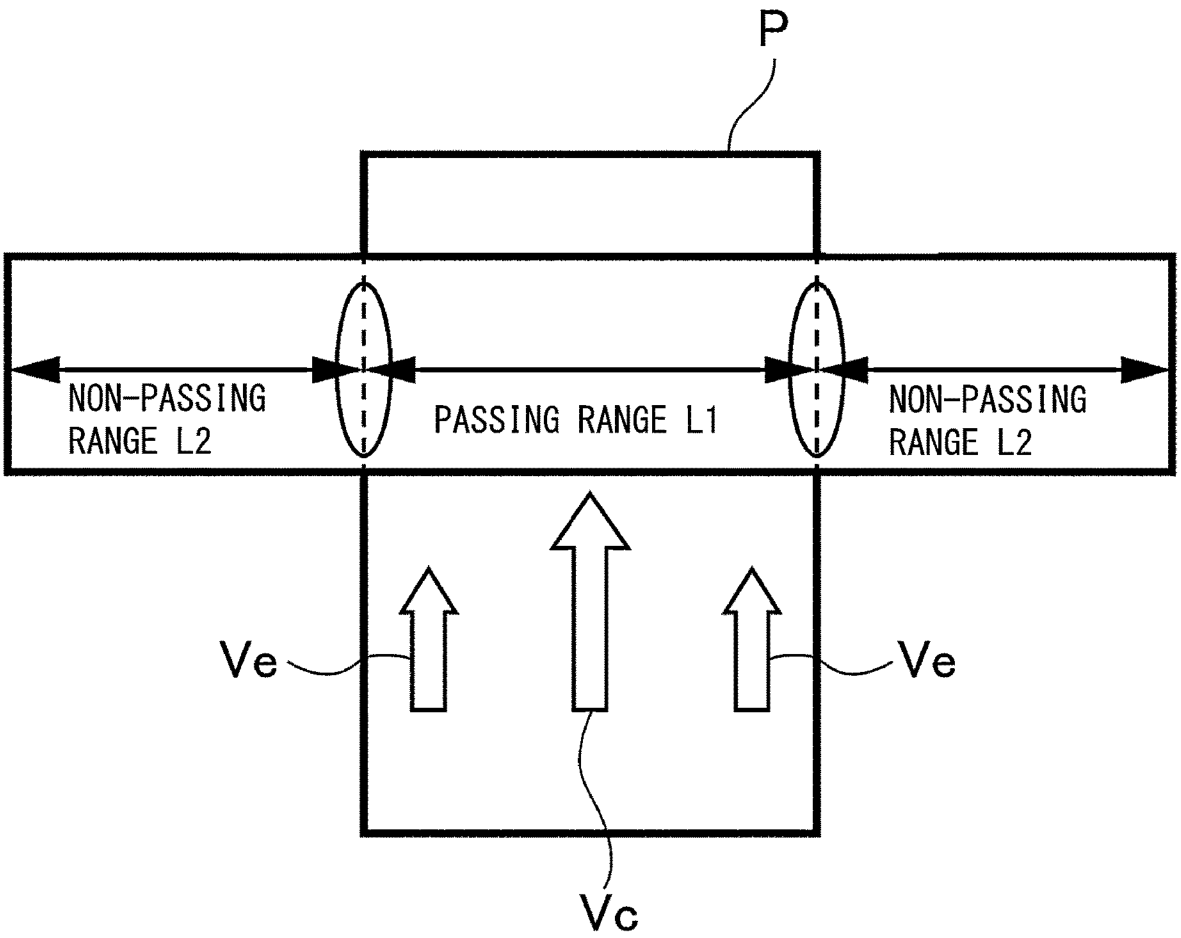
FIG. 5 is a view explaining a mechanism that causes wrinkles on a recording material.
Figure 6:
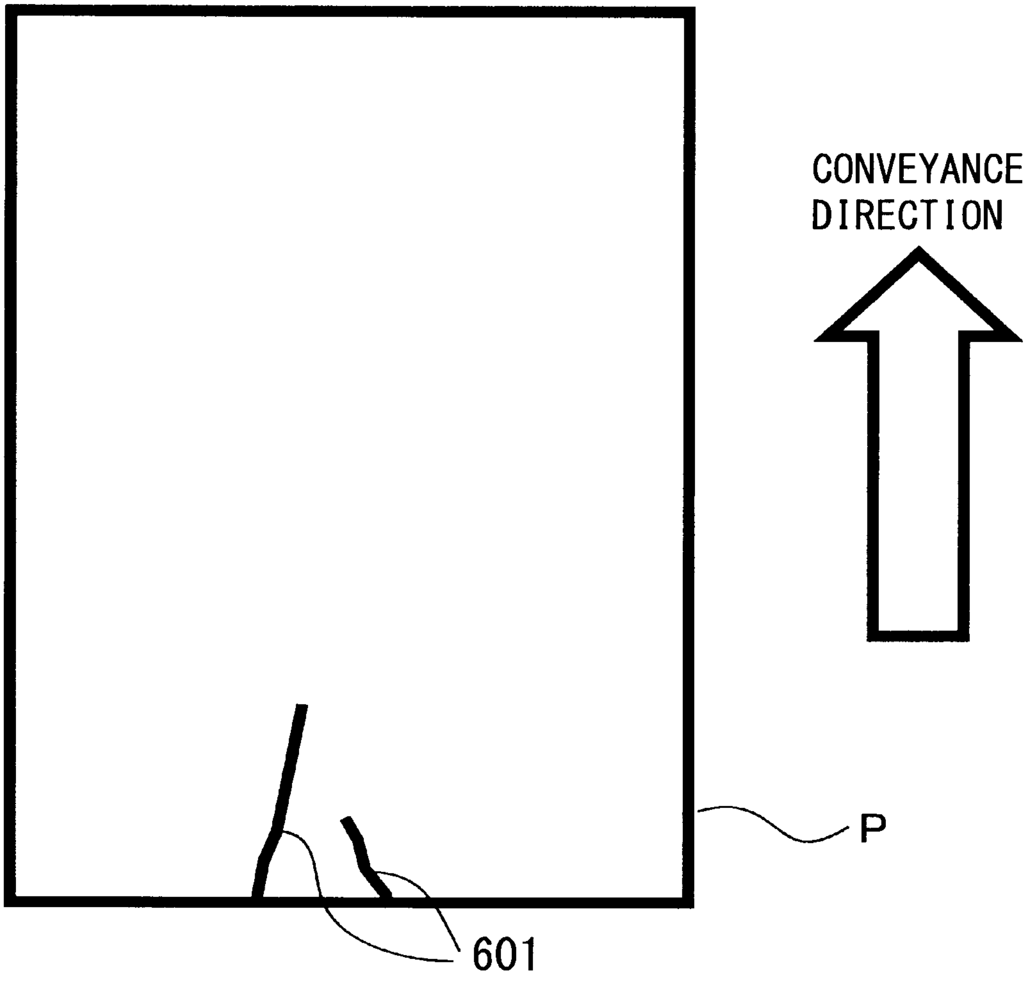
FIG. 6 is a view showing an example of wrinkles that occur on the recording material.

Next, the protruding amount of the downstream end portion 303*b* will be described. Before that, a mechanism by which wrinkles occur in the recording material will be described with referring to FIG. 5 and FIG. 6. For example, when the fixing device 8 in a cold state is started up, a temperature of the central portion of the fixing nip portion N is higher than that of the end portion in the widthwise direction since the end portion is easier to dissipate heat than the central portion in a passing through region L1 of the fixing nip portion N through which the recording material P passes. In such cases, an outer diameter of a central portion of the rotating pressing roller 305 may expand slightly more than the outer diameter of an end portion, causing the pressing roller 305 to form a crown shape. When the recording material P is conveyed with the pressing roller 305 deformed into a crown shape, a conveying rate (velocity) Vc of the central portion becomes faster than a conveying rate Ve of the end portion, as shown in FIG. 5. Due to the difference in conveying rate, end portions in the widthwise direction of the recording material P moves closer to the center side, and as shown in FIG. 6, distortion occurs in a central portion of the recording material P in the widthwise direction upstream of the conveyance direction, and due to the distortion, wrinkles 601 occur in the recording material P.

As a method for detecting the conveying rate described above, preparing a strip of recording material with multiple incisions in the widthwise direction and putting position markings to the recording material. By measuring a time of the same strip position at a point of entry into the fixing nip portion N and at a point of discharging from the fixing nip portion N, and by plotting the rate of the recording material passing through the fixing nip portion N in a longitudinal direction, it is possible to measure an actual conveying rate of the central portion and that of the end portion and to obtain the difference between them.

If the difference of the conveying rate gets large, it becomes easier for wrinkles to occur on the recording material and for uneven gloss to occur on the toner image after fixing, therefore, it is preferable to optimize the conveying rate of the recording material so that the following Equation 1 is satisfied. In Equation 1, "n" is a coefficient less than 1 and is a predetermined value depending on a stiffness of the recording material. For example, when the stiffness of the recording material is "0.30 mN" in the Garley stiffness, then "n≈0.99".

$$\text{Central conveying rate} \times n < \text{end portion conveying rate} \leq \text{central conveying rate} \quad \text{Equation 1}$$

In the Embodiment 1, by forming the fixing pad 303 in the convex shape and thereby making the running direction of the fixing belt 301 face outward with respect to the center as described above, the conveying rate of the recording material is optimized to a speed satisfying the above Equation 1. In order to realize this, the protruding amount of the downstream end portion 303*b* is adjusted by the length in the conveyance direction of the fixing nip portion N and a pressuring force of the pressing roller 305. That is, when the length in the conveyance direction of the fixing nip portion N is short, then a distance at which the recording material is pulled outward is shortened, therefore wrinkles are more likely to occur on the recording material. Conversely, when the length in the conveyance direction of the fixing nip portion N is long, then the distance at which the recording material is pulled outward becomes long, therefore wrinkles are less likely to occur on the recording material. Therefore, when the length in the conveyance direction of the fixing nip portion N is short, it is preferable to set the protruding amount of the downstream end portion 303*b* larger, and when the length in the conveyance direction of the fixing nip portion N is long, it is preferable to set the protruding amount of the downstream end portion 303*b* smaller.

When the pressuring force of the pressing roller 305 is high, a length in the conveyance direction at the both end portions in the widthwise direction of the fixing nip portion N becomes longer than a length in the conveyance direction of the central portion of the fixing nip portion N. This is because the both end portions of the pressing roller 305 are restricted in movement by a sheet metal, while the central portion is not. Therefore, as the pressuring force is increased, the both end portions of the pressing roller 305 do not fluctuate, but the central portion of the pressing roller 305 is flexed. As a result, the length in the conveyance direction at the both end portions in the widthwise direction of the fixing nip portion N becomes longer than that of the central portion.

Therefore, when the pressuring force of the pressing roller 305 is high, it is preferable for the protruding amount of the downstream end portion 303*b* to be reduced, and when the pressuring force of the pressing roller 305 is low, it is preferable for the protruding amount of the downstream end portion 303*b* to be increased. Incidentally, in the Embodiment 1, the difference of the length in the conveyance direction of the fixing nip portion N between the end portion and the central portion is within "1.5 mm".

When the recording material is subjected to the conveying force in the fixing nip portion for a longer time at both end portions than at the central portion in comparison, a rate of both end portions of the recording material becomes relatively faster than that of the central portion. As a result, as described above, the running direction of the fixing belt 301 faces outward with respect to the center and then occurrences of wrinkles on the recording material can be suppressed. However, when the pressuring force of the pressing roller 305 is small, wrinkles may occur on the recording material. Therefore, in the Embodiment 1, the fixing pad 303 is formed by adjusting the protruding amount of the downstream end portion 303*b* depending on the length in the conveyance direction of the fixing nip portion N and the pressuring force of the pressing roller 305. When the pressuring force of the pressing roller 305 is low, it is preferable for the protruding amount of the downstream end portion 303*b* to be increased. As explained above, the protruding amount (mm) of the downstream end portion 303*b* is adjusted depending on the length (mm) in the conveyance direction of the fixing nip portion N and the pressuring force (kgf) of the pressing roller 305, which is as shown in Table 1 below in the Embodiment 1.

TABLE 1

| | | Pressurizing Force (kgf) | | |
|---|---|---|---|---|
| Protruding Amount (mm) | | 130 | 160 | 190 |
| Nip Width (mm) | 20 | 0.6 | 0.35 | 0.2 |
| | 24.5 | 0.55 | 0.3 | 0.15 |
| | 30 | 0.5 | 0.25 | 0.1 |

As it can be understood from Table 1, it is preferable for the protruding amount of the downstream end portion 303*b* to be "equal to or more than 0.1 mm and equal to or less than 0.6 mm". For example, depending on the pressuring force of the pressing roller 305, when the length of the fixing nip portion N in the conveyance direction is "20 mm", it is preferable for the protruding amount of the downstream end portion 303*b* to be "equal to or more than 0.2 mm and equal to or less than 0.6 mm", when the length of the fixing nip portion N in the conveyance direction is "24.5 mm", it is preferable for the protruding amount of the downstream end portion 303*b* to be "equal to or more than 0.15 mm and equal to or less than 0.55 mm", and when the length of the fixing nip portion N in the conveyance direction is "30 mm", it is preferable for the protruding amount of the downstream end portion 303*b* to be "equal to or mora than 0.1 mm and equal to or less than 0.5 mm". Thus, in cases where the length in the conveyance direction of the fixing nip portion N is the same, the protruding amount of the downstream end portion 303*b* is a first protruding amount when the pressuring force of the pressing roller 305 is a first pressuring force, and the protruding amount of the downstream end portion 303*b* is a second protruding amount which is smaller than the first protruding amount when the pressuring force of the pressing roller 305 is a second pressuring force which is larger than the first pressuring force.

Incidentally, the protruding amount of the downstream end portion 303*b* in Table 1 can be calculated using the structural calculation finite element method analysis software "ABAQUS". Simulation conditions are shown below. The fixing belt 301 is set to have an outer diameter of "150 mm", an elastic layer with a thickness of "300 μm" and the Young's modulus of "0.4 MPa", a base material with a thickness of "80 μm" and the Young's modulus of "5 GPa". The pressing roller 305 is set to have an outer diameter of "(HO mm," an elastic layer with a thickness of "8 mm" and the Young's modulus of "0.1-0.6 MPa". In addition, the pressuring force of the pressing roller 305 is set to "130-190 kgf", a rotational speed of the pressing roller 305 is set to "450 mm/s", and the coefficient of friction between the recording material and the pressing roller 305 is set to "0.3".

In this simulation, the Young's modulus of the elastic layer of the pressing roller 305 is alternated in a range of "from 0.1 to 0.6 MPa" depending on the pressuring force of the pressing roller 305 in order to make the length in the conveyance direction of the fixing nip portion N as a desired length. For example, the Young's modulus of the elastic layer is set to "0.6 MPa" to form the length in the conveyance direction as "20 mm" under the pressuring force of "190 kgf". In addition, the Young's modulus of the elastic layer is set to be "0.1 MPa" to form the length in the conveyance direction as "30 mm" under the pressuring force of "130 kgf".

With respect to the protruding amount D (mm) of the downstream end portion 303*b*, a relationship with the length M (mm) in the conveyance direction of the fixing nip portion N and the pressuring force W (kgf) of the pressing roller 305 is shown in Equation 2 based on a multiple regression analysis on relationships of Table 1.

$$D=-0.00997\times M-0.00667\times W+1.648 \quad \text{Equation 2}$$

The protruding amount D of the downstream end portion 303*b* shown in Equation 2 is a relational equation for combinations of configurations in the Embodiment 1, and although values may vary depending on several peripheral parameters, a magnitude relationship between input values and an output value and approximate output value are correct. However, if the protruding amount D of the downstream end portion 303*b* is too small, it becomes difficult for the running direction of the fixing belt 301 at the end portion to face toward the end portion relative to the running direction of the fixing belt 301 at the central portion. Conversely, if the protruding amount D of the downstream end portion 303*b* is too large, then the conveying rate of the recording material at the end portion is larger than the conveying rate of the recording material at the central portion, which may cause trailing end leap of the recording material. In consideration of this point, in a case of the Embodiment 1, the protruding amount D of the downstream end portion 303*b* satisfies a following formula.

$$\text{“}-0.00997\times M-0.00667\times W+1.548<D<-0.00997\times M-0.00667\times W+1.748\text{”} \quad \text{Equation 3}$$

As described above, in the Embodiment 1, the fixing pad 303 of convex shape is used, in which the downstream end portion 303*b*, which slides against the fixing belt 301 downstream of the fixing nip portion N, is projected in the central portion in the widthwise direction to the downstream side in the conveyance direction more than the both end portions. The running direction and the conveying force (vector) of the fixing belt 301 changes depending on the protruding amount of the downstream end portion 303*b*, and the protruding amount of the downstream end portion 303*b* is adjusted depending on the length in the conveyance direction of the fixing nip portion N and the pressuring force of the pressing roller 305. When the fixing pad 303 of the convex shape is used, the fixing belt 301 faces outward in the widthwise direction with respect to the center when passing through the fixing nip portion N, and since the recording material P is conveyed following the running direction of the fixing belt 301, the recording material P is conveyed with being pulled from the center to the both end sides. In addition, by making the downstream end portion 303*b* more downstream than the fixing nip portion N convex shape, it is unlikely to affect a uniformity of pressure distribution in the fixing nip portion N. Therefore, it is possible to suppress occurrences of wrinkles on the recording material without causing a difference in a fixing performance of the toner image to the recording material between the central portion and the end portion in the widthwise direction in the fixing nip portion N.

Incidentally, the protruding amount of the downstream end portion 303*b* may be changed depending on a crown amount in the widthwise direction of the pressing roller 305 formed in the crown shape, other than the above description. This is because the crown amount of the pressing roller 305 may change a distribution of the length in the widthwise direction of the fixing nip portion N with respect to the widthwise direction. Therefore, if the pressing roller 305 is formed in a reversed crown shape, then it is possible to make the protruding amount of the downstream end portion 303*b* small.

Embodiment 2

Next, an Embodiment 2 will be described. In the Embodiment 1 described above, the fixing pad 303 of which the downstream end portion 303*b* side is protruded to be the convex shape is described, however, it is not limited to this, but the fixing pad may be a fixing pad 303A of which an upstream end portion 303*c* side is caved in to be a concave shape. Therefore, as the Embodiment 2, the fixing pad 303A of which the upstream end portion 303*c* side is caved in to be the concave shape will be described using FIG. 7 with reference to FIG. 2. Incidentally, since the Embodiment 2 described below differs only in the shape of the fixing pad from the Embodiment 1 described above, and the other configurations may be the same, therefore, the same reference numeral is attached to the same configurations as the Embodiment 1 described above and descriptions for those configurations are simplified or omitted.

Figure 7:
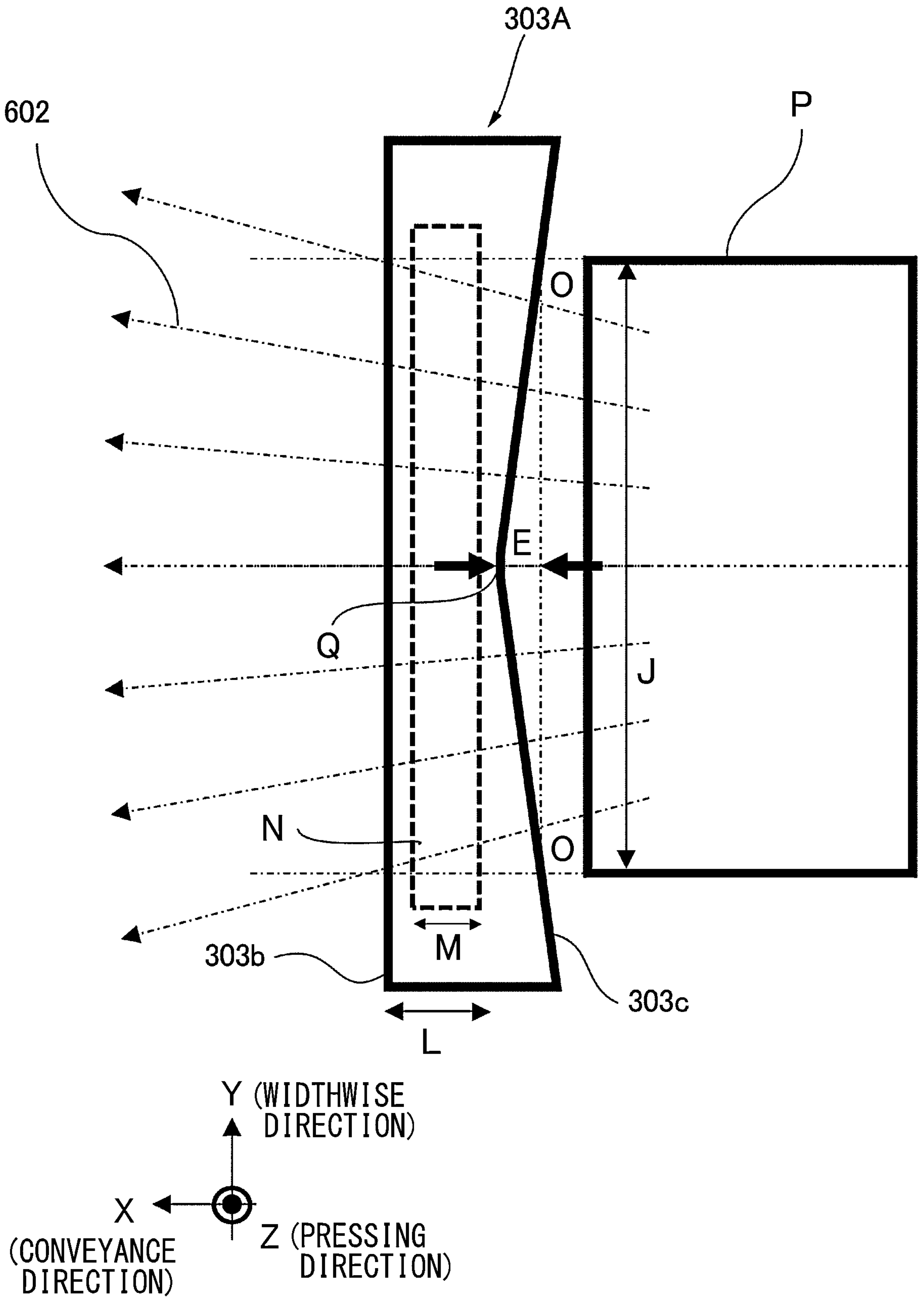
FIG. 7 is a view of a fixing pad of an Embodiment 2 viewed from an opposite side of a pressing direction.

As shown in FIG. 7, the fixing pad 303A of the Embodiment 2 is formed, with a center of the fixing nip portion N in the widthwise direction (direction of Y) as an apex, in a concave shape with the central portion of the upstream end portion 303*c* being caved in to downstream side in the conveyance direction more than both end portions. The upstream end portion 303*c* caves in downstream side in the conveyance direction as it goes from the both end portions in the widthwise direction to the center, and the center in the widthwise direction substantially corresponds to the center of the fixing nip portion N. And a length in the widthwise direction of the upstream end portion 303*c* is longer than the maximum passing through range J through which the maximum width of the recording material P capable of forming an image in the fixing nip portion N can pass. Incidentally, the shape of the upstream end portion 303*c* is not limited to being formed with straight lines connecting from the center to one end portion and from the center to the other end portion, respectively, as shown in the figure, but may be formed, for example, in a quadratic curved shape smoothly connecting from one end portion to the other end portion via the center.

And the fixing pad 303A is formed so that the central portion in the widthwise direction is thin in the conveyance direction and the both end portions in the widthwise direction is thick in the conveyance direction. That is, a length L in the conveyance direction from the downstream end portion 303*b* to the upstream end portion 303*c* is short in the central portion of the fixing nip portion N and becomes longer as it goes from the central portion to the end portions.

Viewing the fixing pad 303A from an opposite side of a pressing direction (direction of arrow Z) in which the fixing pad 303A is pressed by the pressing roller 305, a concave amount E from an end position O in the widthwise direction, where the maximum passing through range J and the upstream end portion 303*c* described above intersect, to a downstreammost position Q of the upstream end portion 303*c* is set to “0.3 mm”, for example, with respect to the conveyance direction. For example, when the maximum passing through range J is “300 mm”, then the end position O is located “150 mm” away from the center with respect to the widthwise direction, and the downstreammost position Q is protruding by “0.3 mm” from the end position O to the downstream side in the conveyance direction.

By forming the fixing pad 303A in the concave shape, the fixing belt 301 runs as the running direction in the widthwise direction (indicated by the dotted line 602) faces outward with respect to the center (here, the downstreammost position Q) when the fixing belt 301 is passing through the fixing nip portion N. As the fixing belt 301 is further away from the center toward the end portion, the running direction of the fixing belt 301 is facing more outward. Since the recording material P is conveyed following the running direction of the fixing belt 301, the recording material P is conveyed and passing through the fixing nip portion N with being pulled from the center to both end sides. The running direction and the conveying force (vector) of the fixing belt 301 depend on the concave amount of the upstream end portion 303*c*.

The concave amount E (mm) of the upstream end portion 303*c* is adjusted, similar to the protruding amount D of the downstream end portion 303*b* described above, depending on a length M (mm) in the conveyance direction of the fixing nip portion N and the pressuring force (kgf) of the pressing roller 305, which is Table 1 as described above for the Embodiment 2. Therefore, the concave amount E of the upstream end portion 303*c* satisfies the following Equation 4.

$$\text{“}-0.00997\times M-0.00667\times W+1.548<E<-0.00997\times M-0.00667\times W+1.748\text{”} \qquad \text{Equation 4}$$

As described above, in the Embodiment 2, the fixing pad 303A is formed with the upstream end portion 303*c* being caved in the concave shape. In the case of the concave shape also, similar to the fixing pad 303 of the Embodiment 1, the running direction of the fixing belt 301 faces outward with respect to the center when the fixing belt 301 passes through the fixing nip portion N.

Therefore, the same effect as in the Embodiment 1 described above can be obtained: since the recording material is conveyed and passing through the fixing nip portion N with being pulled from the center to the both end sides, it is possible to suppress occurrences of wrinkles on the recording material.

Incidentally, when the fixing pad 303 is formed in the convex shape with the downstream end portion 303*b* being protruded as in the Embodiment 1, a separability of the recording material discharged from the fixing nip portion N may decrease. For this reason, a separation member formed in a crown shape may be provided downstream side of the fixing nip portion N. In contrast to this, when the fixing pad 303A is formed in the concave shape with the upstream end portion 303*c* being caved in as in the Embodiment 2, the separability of the recording material discharged from the fixing nip portion N is not reduced, therefore the separating member need not be provided downstream side of the fixing nip portion N.

Embodiment 3

Next, an Embodiment 3 will be described. The Embodiment 3 is a fixing pad 303B of which downstream end portion 303*b* side is protruded to be the convex shape and the upstream end portion 303*c* side is caved in to be the concave shape, compared to the Embodiment 1 and the Embodiment 2 described above. The fixing pad 303B of the Embodiment 3 will be described using FIG. 8 with reference to FIG. 2. Incidentally, since the Embodiment 3 described below differs only in the shape of the fixing pad from the Embodiment 1 and the Embodiment 2 described above, and the other configurations may be the same, therefore, the same reference numeral is attached to the same configurations as the Embodiment 1 and the Embodiment 2 described above and descriptions for those configurations are simplified or omitted.

Figure 8:
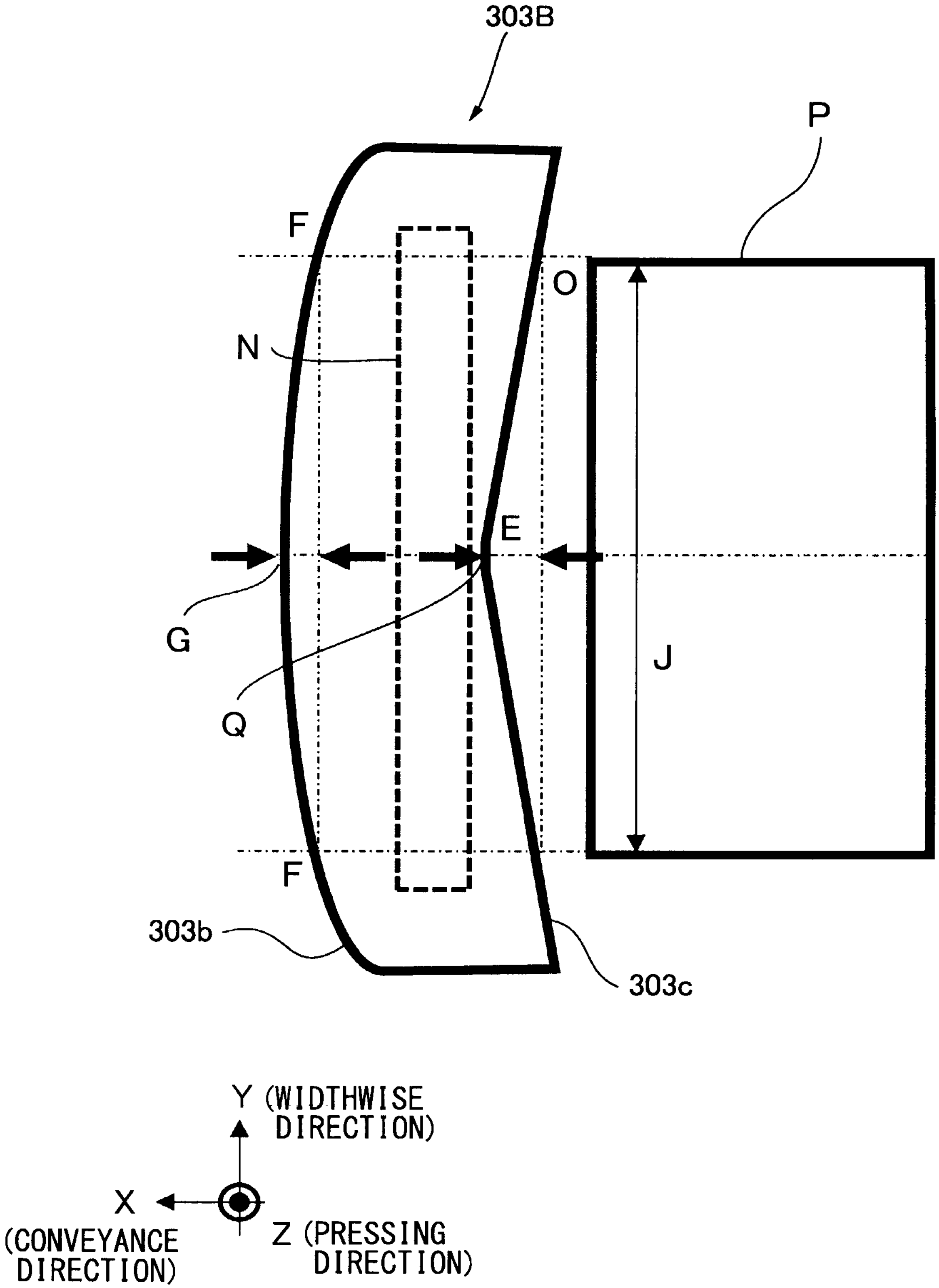
FIG. 8 is a view of a fixing pad of an Embodiment 3 viewed from an opposite side of a pressing direction.

The fixing pad 303B shown in FIG. 8 is formed, with a center of the fixing nip portion N in the widthwise direction (direction of Y) as an apex, in a convex shape with the central portion of the downstream end portion 303*b* being protruded to the downstream side in the conveyance direction more than both end portions, and in a concave shape with the central portion of the upstream end portion 303*c* being caved in to downstream side in the conveyance direction more than the both end portions. In the case of this shape also, the running direction of the fixing belt 301 faces outward with respect to the center when the fixing belt 301 passes through the fixing nip portion N. Therefore, since the recording material is conveyed and passing through the fixing nip portion N with being pulled from the center to the both end sides, it is possible to suppress occurrences of wrinkles on the recording material.

In the case of the Embodiment 3, both the protruding amount (mm) of the downstream end portion 303*b* and the concave amount (mm) of the upstream end portion 303*c* take values as shown in Table 2 below. As it can be understood from Table 2, the protruding amount of the downstream end portion 303*b* and the concave amount of the upstream end portion 303*c* is preferable to be "equal to or more than 0.05 mm and equal to or less than 0.3 mm".

TABLE 2

| Protruding Amount (mm) / Concave Amount (mm) | | Pressurizing Force (kgf) 130 | 160 | 190 |
|---|---|---|---|---|
| Nip Width (mm) | 20 | 0.3 | 0.175 | 0.1 |
| | 24.5 | 0.275 | 0.15 | 0.075 |
| | 30 | 0.25 | 0.125 | 0.05 |

The above values are results of simulation using the structural calculation finite element method analysis software "ABAQUS" with the same parameter conditions as in the Embodiment 1. With respect to the protruding amount D (mm) of the downstream end portion 303*b* and the concave amount E (mm) of the upstream end portion 303*c*, a relationship with the length M (mm) in the conveyance direction of the fixing nip portion N and the pressuring force W (kgf) of the pressing roller 305 is shown in Equation 5 based on relationships of Table 2.

$$D(E)=-0.00498\times M-0.00333\times W+0.824 \quad \text{Equation 5}$$

Each of the protruding amount D of the downstream end portion 303*b* and the concave amount E of the upstream end portion 303*c* shown in Equation 4 is a relational equation for combinations of configurations in the Embodiment 3, and although values may vary depending on several peripheral parameters, a magnitude relationship between input values and an output value and approximate output value are correct. In the Embodiment 3, the protruding amount D of the downstream end portion 303*b* satisfies formula 6 shown below, and the concave amount E of the upstream end portion 303*c* satisfies formula 7 shown below.

$$“-0.00498\times M-0.00333\times W+0.724<D<-0.00498\times M-0.00333\times W+0.924” \quad \text{Equation 6}$$

$$“-0.00498\times M-0.00333\times W+0.724<E<-0.00498\times M-0.00333\times W+0.924” \quad \text{Equation 7}$$

As described above, in the Embodiment 3, the fixing pad 303B is formed with the downstream end portion 303*b* being protruded to be the convex shape and with the upstream end portion 303*c* being caved in to be the concave shape. In the case of this shape also, the running direction of the fixing belt 301 faces outward with respect to the center when the fixing belt 301 passes through the fixing nip portion N. Therefore, the same effect as in the Embodiment 1 and the Embodiment 2 described above can be obtained: since the recording material is conveyed and passing through the fixing nip portion N with being pulled from the center to the both end sides, it is possible to suppress occurrences of wrinkles on the recording material.

<Examination Experiments>

Inventors of the present invention confirmed effects obtained by differences in the protruding amount D of the downstream end portion 303*b* and the concave amount E of the upstream end portion 303*c* in experiments. In the experiments, 100% black monochrome images were formed all over continuously on both sides of the recording material of Oji Paper OK Topcoat+79.1 g with a width of 297 mm×a length of 420 mm. Result of the experiments are shown in Table 3.

TABLE 3

| | Protruding Amount (mm) Concave Amount (mm) | Point | Pressurizing Force (kgf) | Nip Width (mm) | Existence or Non-existance of Wrinkles and Uneven Gloss |
|---|---|---|---|---|---|
| Conventional Example | 0 | — | 160 | 24.5 | Wrinkles Exist |
| Embodiment 1 | 0.3 | Downstream | 160 | 24.5 | No Problem |
| Comparative Example 1 | 0.1 | Downstream | 160 | 24.5 | No Wrinkles, Uneven Gloss Exists |
| Embodiment 2 | 0.3 | Upstream | 160 | 24.5 | No Problem |
| Comparative Example 2 | 0.3 | Upstream | 130 | 24.5 | No Wrinkles, Uneven Gloss Exists |
| Embodiment 3 | 0.15 | Downstream and Upstream | 160 | 24.5 | No Problem |
| Comparative Example 3 | 0.05 | Downstream and Upstream | 160 | 20 | No Wrinkles, Uneven Gloss Exists |

As it can be understood from Table 3, in a case of a conventional example, wrinkles occurred on the recording material, but in the cases from the Embodiment 1 to the Embodiment 3 described above, wrinkles did not occur on the recording material. However, in the cases from the Embodiment 1 to Embodiment 3 described above, if the conveying force of the fixing belt 301 differs greatly between the center and the end portion in the widthwise direction, excessive stress is applied to the recording material, which may result in uneven gloss on the toner image.

According to the results of the experiment shown in Table 3, in Comparative Example 1, the protrusion amount is set to "0.1 mm", which is smaller than the "0.3 mm" of the Embodiment 1, and wrinkles do not occur on the recording material as same as the Embodiment 1 but uneven gloss occurs on the toner image. In Comparative Example 2, the concave amount is set to "0.3 mm" as same as the Embodiment 2, but the pressuring force of the pressing roller 305 is "130 kgf", which is smaller than "160 kgf" of the Embodiment 2, and wrinkles do not occur on the recording material as same as the Embodiment 2 but uneven gloss occurs on the toner image. Comparative Example 3 is a case where the protruding amount and the length in the conveyance direction of the fixing nip portion N (described as nip width) are smaller than those of the Embodiment 3, and wrinkles do not occur on the recording material as same as the Embodiment 3, but uneven gloss occurs on the toner image. In Comparative Example 1, Comparative Example 2 and Comparative Example 3 above, the protruding amount D and the concave amount E do not satisfy Equation 3, Equation 4, Equation 6, and Equation 7, respectively.

Other Embodiments

Incidentally, the Embodiments described above are not limited to a configuration in which the fixing belt 301 is heated, but it can also be applied to a configuration in which a belt-shaped pressing belt is used instead of the pressing roller 305 and the pressing belt is heated by a heating heater, etc. In such cases, a pressing pad may be disposed inside the pressing belt, and the pressing pad can be configured in the same way as the fixing pad 303 described above.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-093478 filed on Jun. 9, 2022, which is hereby incorporated by reference herein in its entirety.

What is claimed is:

1. A fixing device comprising:

a rotatable endless belt;

a rotatable member configured to contact an outer peripheral surface of the belt, the rotatable member forming a nip portion in cooperation with the belt, nipping and conveying a recording material on which a toner image is formed in the nip portion and fixing the toner image onto the recording material by application of heat and pressure;

a nip forming member configured to contact an inner peripheral surface of the belt and form the nip portion by being disposed opposite to the rotatable member, wherein the nip forming member is a non-rotatable member and includes a contact area in contact with the inner peripheral surface of the belt, wherein the contact area includes a downstream end portion with respect to a conveyance direction of the recording material, wherein the downstream end portion locates downstream of the nip portion with respect to the conveyance direction and includes a central portion and both end portions with respect to a widthwise direction of the belt, and wherein the central portion locates downstream of the both end portions with respect to the conveyance direction.

2. A fixing device according to claim 1, wherein the downstream end portion extends toward downstream with respect to the conveyance direction as going to the central portion from the both end portions.

3. A fixing device according to claim 1, wherein with respect to the widthwise direction, the central portion substantially corresponds to a center of the nip portion.

4. A fixing device according to claim 3, wherein the central portion locates downstream most of the downstream portion with respect to the conveyance direction.

5. A fixing device according to claim 3, wherein a central position is defined as a center, with respect to the widthwise direction, of a maximum width of the recording material capable of passing through the fixing device, wherein an end position is defined as a position where the maximum width of the recording material and the downstream end portion are intersected, and wherein in a state in which the central position and the central portion substantially corresponds each other, when a length from the end position to the central portion of the downstream end portion with respect to the conveyance direction is D, a length of the nip portion with respect to the conveyance direction is M (mm) and a pressuring force of the rotatable member is W (kgf), a following formula is satisfied $$-0.00997\times M-0.00667\times W+1.548<D<-0.00997\times M-0.00667\times W+1.748.$$

6. A fixing device according to claim 5, wherein the D is equal to 0.1 mm or more and equal to 0.6 mm or less.

7. A fixing device according to claim 1, wherein with respect to the widthwise direction, a length of the contact area is longer than a maximum width of the recording material capable of passing through the fixing device.

8. A fixing device according to claim 1, wherein the contact area includes an upstream end portion with respect to the conveyance direction, wherein the upstream end portion includes an upstream central portion and upstream both end portions, and wherein the upstream central portion is downstream of the upstream both end portions with respect to the conveyance direction.

* * * * *